Nov. 29, 1960  R. R. SWANBERG  2,962,324
FLOATING BRAKE DRUM
Filed March 23, 1959
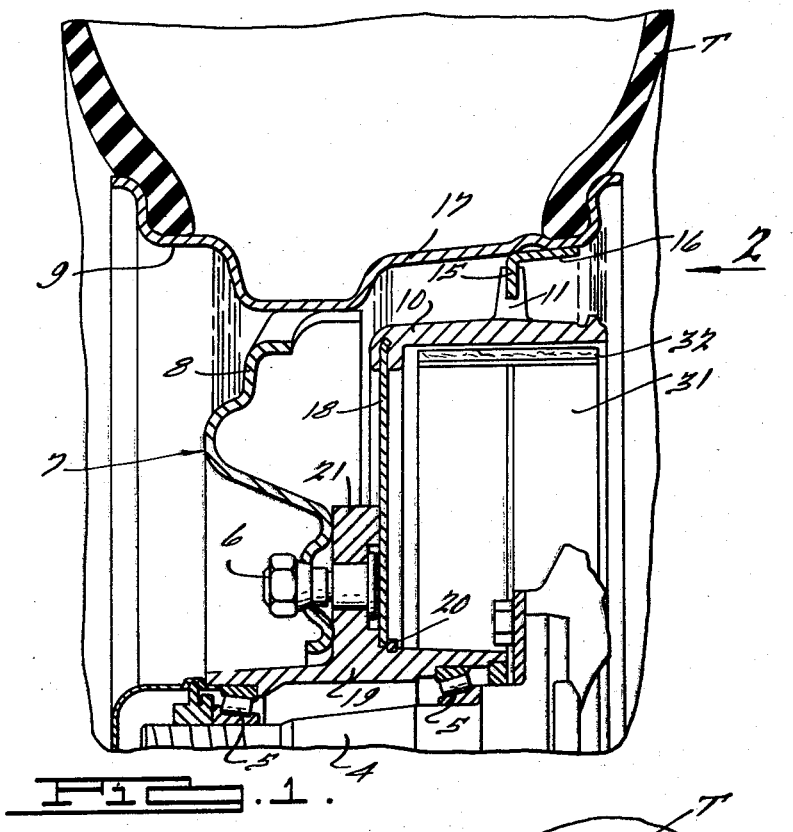
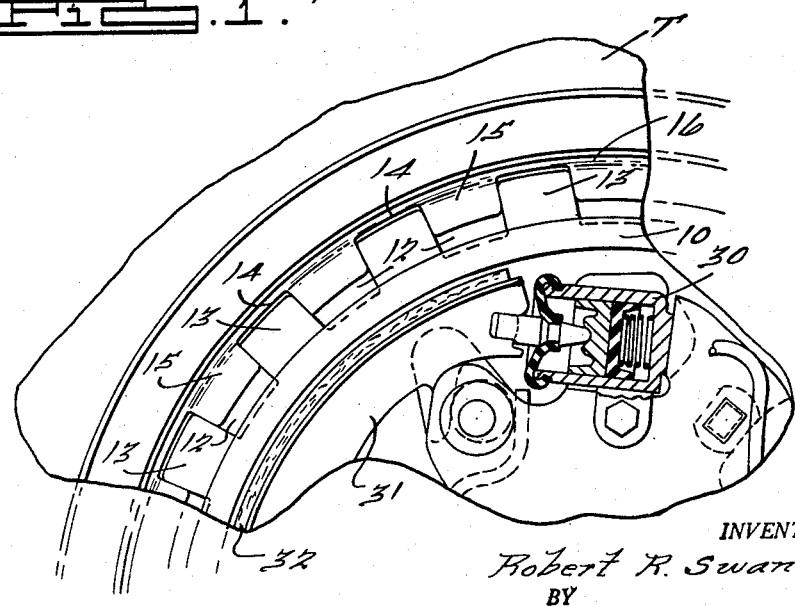
INVENTOR.
Robert R. Swanberg.
BY
Harness and Harris
ATTORNEYS.

United States Patent Office 2,962,324
Patented Nov. 29, 1960

2,962,324

FLOATING BRAKE DRUM

Robert R. Swanberg, Pinckney, Mich., assignor to Chrysler Corporation, Highland Park, Mich., a corporation of Delaware Filed Mar. 23, 1959, Ser. No. 801,128

8 Claims. (Cl. 301—6)

This invention relates to a floating drum brake, particularly adapted for motor vehicle use, wherein the brake drum is floatingly mounted on the rim of the wheel assembly so that it may expand radially while transmitting the braking forces directly from the drum to the wheel rim and surrounding tire. Due to the floating mounting of the brake drum on the wheel assembly, deformation of the brake drum during braking does not present certain problems that are existent in wheel brakes wherein the drum is fixedly mounted on the wheel unit. Furthermore, this floating drum design results in elimination of all drum and shoe generated brake noises due to the fact that the drum backing plate is not required to carry the braking forces but merely serves as a positioning means for the drum. It is thought that the floating mounting of the brake drum on the wheel rim, which causes the braking forces to be transmitted directly from the drum to the wheel rim to the wheel tire rather than through the drum backing plate, the lug bolts, the wheel hub and thence through the wheel web to the rim and tire, eliminates or damps certain vibrations that are set up during braking that tend to cause disagreeable noise conditions.

It is a primary object of this invention to provide a floating brake drum mounting on a wheel unit that lends itself to noise-free brake operation because the braking forces are transmitted directly from the drum through the wheel rim to the wheel tire.

It is a further object of this invention to provide a floating brake drum mounting on a wheel assembly that will compensate for brake drum distortion and brake noise during braking to thereby improve braking action.

It is a further object of this invention to provide an improved type of brake assembly that lends itself to reduced cost manufacture as well as improved braking operation.

It is still another object of this invention to provide a floating brake drum construction wherein the brake drum backing plate is floatingly mounted on the wheel hub and is free of braking forces.

Other objects and advantages of this invention will be readily apparent from a consideration of the following description considered with the related drawings wherein:

Fig. 1 is a fragmentary sectional elevational view of a vehicle wheel assembly that mounts a brake drum embodying this invention; and Fig. 2 is a fragmentary side elevational view, partly in section, taken looking in the direction of the arrow 2 of Fig. 1.

Figs. 1 and 2 of the drawings show a vehicle wheel assembly including a wheel spindle 4 having bearings 5 thereon that rotatably mount the hub 19 of the wheel unit 7. The wheel unit 7 includes a radially extending web portion 8 that has fixed thereto a peripheral rim 17 that seats a conventional tire T. The wheel unit 7 is connected to the wheel hub 19 by stud bolt-and-nut assemblies 6 that are of more or less conventional design.

The brake drum 10, that embodies this invention is floatingly connected to the wheel unit rim 17 through slot and finger or lug connections that permit relative radial movement between the drum 10 and the wheel unit rim 17. It will be noted that the brake drum 10, on its outer peripheral surface, has a rim 11 provided with slots 12 and lugs or fingers 13 that matingly engage slots 14 and lugs or fingers 15 formed on a flanged collar 16 carried by the wheel rim 17. The slot and finger or lug connections 12—15 provide for limited relative radial movement of the drum 10 with respect to the rim 17 while preventing relative circumferential movement between the finger and slot connected drum and rim elements 10, 17 so that drive may be transmitted directly therebetween.

The brake drum supporting backing plate 18 is journalled on the wheel hub 19 and is locked against axial movement relative thereto by the snap ring 20 and wheel hub flange 21. The radially extending flange 21 on wheel hub 19 bears against and supports the backing plate 18 in addition to providing the means for connecting the web portion 8 of the wheel unit 7 to the wheel hub 19.

With the disclosed arrangement of mounting the brake drum 10 on the wheel unit 7, bell mouthing of the drum 10 during braking can be accommodated through the floating, drive transmitting, connections 12—15. Furthermore, vibrations that might be set up in the drum 10 during braking to produce brake squeal, or other types of objectionable brake noises, are apparently damped by the finger and slot connections 12—15 between the wheel rim 17 and the brake drum 10.

It will be noted that in the form of the invention shown the wheel rim 17 has a separate flange collar 16 that provides the finger and slot formations 14, 15. It is thought to be obvious that the collar formation 16 could be an integral part of the wheel rim member 17.

It is thought that one of the prime distinctions between this floating brake drum construction and prior art constructions is the fact that the braking forces are directly transmitted from the drum 10 to the surrounding wheel rim 17 and tire T so that the drum backing plate 18 is free of braking forces and can merely float on the wheel hub 19.

Fig. 2 of the drawings shows the above described brake drum associated with brake actuating mechanism that includes a wheel cylinder 30 connected to a brake shoe 31 that has a lined outer surface 32 adapted to be frictionally engaged with the inner peripheral surface of the brake drum 10. Additional description of the brake actuating mechanism is not thought to be required as a brake of this type is clearly disclosed in Robert F. Smith, U.S. Patents Nos. 2,765,051, issued October 2, 1956, and 2,828,034, issued April 1, 1958.

I claim:

1. In a wheel unit brake assembly comprising a wheel rim, a brake drum floatingly mounted on and concentrically arranged within said wheel rim and radially spaced therefrom, interengaged, relatively movable drive transmitting means connecting said wheel rim and drum providing the only direct connection therebetween for the transmission of braking forces and permitting relative radial movement therebetween.

2. In a wheel unit brake assembly comprising a wheel rim, a brake drum floatingly mounted on and concentrically arranged within said wheel rim and radially spaced therefrom, interengaged radially extending, relatively movable, finger and slot, drive transmitting means connecting said wheel rim and drum providing the only direct connection therebetween for the transmission of braking forces and permitting relative radial movement therebetween.

3. In a wheel unit brake assembly comprising a wheel rim, a brake drum floatingly mounted on and concentrically arranged within said wheel rim and radially spaced therefrom, interengaged radially extending, relatively movable finger and slot, drive transmitting means connecting said wheel rim and drum providing the only direct connection therebetween for the transmission of braking forces and permitting relative radial movement therebetween, said brake drum having a supporting portion journaled on a portion of the wheel unit.

4. In a wheel unit brake assembly comprising a wheel rim, a brake drum floatingly mounted on and concentrically arranged within said wheel rim and radially spaced therefrom, interengaged radially extending, slidably engaged finger and slot, drive transmitting means connecting said wheel rim and drum providing the direct connection therebetween for the transmission of braking forces and permitting relative radial movement therebetween, said brake drum having a radially extending backing plate piloted on the hub portion of the wheel unit for movement relative thereto.

5. In combination, a wheel unit comprising a hub portion, a connected, radially extending web portion and a connected, axially extending, rim adapted to seat a tire, an annular, axially extending brake drum concentrically arranged within and radially spaced from said wheel rim, radially extending, slidably engaged, finger and slot means providing the sole drive transmitting means directly connecting said brake drum and wheel rim and permitting relative radial movement therebetween while floatingly mounting the brake drum on the wheel rim.

6. In combination, a wheel unit comprising a hub portion, a connected, radially extending, web portion and a connected, axially extending, rim adapted to seat a tire, an annular, axially extending brake drum concentrically arranged within and radially spaced from said wheel rim, radially extending, lug and slot, slidably engaged, drive transmitting means providing the only means drivingly connecting said brake drum and wheel rim and permitting relative radial movement therebetween, said brake drum having a radially extending backing plate portion floatingly seated on the wheel hub portion.

7. In combination, a wheel unit comprising a hub portion, a connected, radially extending, web portion and a connected, axially extending, rim adapted to seat a tire, an annular, axially extending brake drum concentrically arranged within and radially spaced from said wheel rim, radially extending, lug and slot, slidably engaged, drive transmitting means providing the sole means drivingly connecting said brake drum and wheel rim and permitting relative radial movement therebetween, said brake drum having a radially extending backing plate portion floatingly seated on the wheel hub portion and free of drive transmitting connection thereto.

8. In combination, a wheel unit comprising a hub portion, a connected, radially extending, web portion and a connected, axially extending, rim adapted to seat a tire, an annular axially extending brake drum concentrically arranged within and radially spaced from said wheel rim, radially extending, lug and slot, slidably engaged, drive transmitting means providing the sole means drivingly connecting said brake drum and wheel rim and permitting relative radial movement therebetween, said brake drum having a radially extending backing plate portion floatingly journaled on the wheel hub portion and free of drive transmitting connection thereto but adjacent to and restrained against axial movement relative to said wheel hub portion.

References Cited in the file of this patent
UNITED STATES PATENTS

| | | |
|---|---|---|
| 1,504,167 | Trout | Aug. 5, 1924 |
| 1,906,737 | Burgess | May 2, 1933 |
| 1,982,698 | Sauzedde | Dec. 4, 1934 |
| 2,478,803 | Ash | Aug. 9, 1949 |
| 2,646,315 | Richard | July 21, 1953 |